US012722514B2

(12) United States Patent
Lee et al.

(10) Patent No.: US 12,722,514 B2
(45) Date of Patent: Sep. 1, 2026

(54) METHOD AND DEVICE FOR DETECTING ELECTRIC VEHICLE USING EXTERNAL CAMERA AND ELECTRIC VEHICLE CHARGING ROBOT USING THE SAME

(71) Applicants: Hyundai Motor Company, Seoul (KR); Kia Corporation, Seoul (KR)

(72) Inventors: Min Kyu Lee, Hwaseong (KR); Jae Ho Lee, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 869 days.

(21) Appl. No.: 18/077,955

(22) Filed: Dec. 8, 2022

(65) Prior Publication Data

US 2023/0191934 A1 Jun. 22, 2023

(30) Foreign Application Priority Data

Dec. 21, 2021 (KR) ........................ 10-2021-0183360

(51) Int. Cl.
*H02J 7/00* (2026.01)
*B60L 53/37* (2019.01)
*G06T 7/70* (2017.01)

(52) U.S. Cl.
CPC ................ *B60L 53/37* (2019.02); *G06T 7/70* (2017.01); *G06T 2207/20084* (2013.01); *G06T 2207/30252* (2013.01)

(58) Field of Classification Search
None
See application file for complete search history.

(56) References Cited

U.S. PATENT DOCUMENTS 11,200,679 B1 * 12/2021 Li .............................. G06T 7/77
11,537,134 B1 * 12/2022 Wiest .................. G06N 3/0455
(Continued)

FOREIGN PATENT DOCUMENTS

KR 10-1823541 B1 1/2018
KR 10-2003387 B1 7/2019
KR 10-2019-0095910 A 8/2019

OTHER PUBLICATIONS

Chen B. et al., "MnasFPN: Learning Latency-aware Pyramid Architecture for Object Detection on Mobile Devices", Computer Vision Foundation, pp. 13607-13616.
(Continued)

*Primary Examiner* — Arun C Williams
(74) *Attorney, Agent, or Firm* — Fox Rothschild LLP

(57) ABSTRACT

The present disclosure provides a method of detecting a position of a vehicle such as an electric vehicle (EV) using a camera to determine whether the EV may be parked or located in a proper position. The vehicle position detection method, which may be performed by a device comprising a processor, includes: acquiring an original image of a vehicle from a camera; converting the original image into a bird's eye view image; detecting a bounding box associated with of the vehicle in the bird's eye view image by using the original image and the bird's eye view image; projecting the bird's-eye view image including the bounding box into a plane parallel with a ground to generate a projection image; and estimating a distance to the vehicle from a predetermined reference point or an orientation of the vehicle with respect to a predetermined reference line.

18 Claims, 9 Drawing Sheets

(56) References Cited

U.S. PATENT DOCUMENTS

| | | | | |
|---|---|---|---|---|
| 2009/0268027 | A1 | 10/2009 | Yang | |
| 2020/0016760 | A1 | 1/2020 | Lee | |
| 2020/0066036 | A1 | 2/2020 | Choi | |
| 2020/0137322 | A1* | 4/2020 | Yokota | G06T 7/174 |
| 2021/0001736 | A1* | 1/2021 | Schoob | B60L 53/37 |

OTHER PUBLICATIONS

Zhu, M. et al., "Monocular 3D Vehicle Detection Using Uncalibrated Traffic Cameras through Homography", arXiv:2103.15293v2 [cs. CV] (Jan. 4, 2022) 8 pages.
Howard, A et al., "Searching for MobileNetV3", Computer Vision Foundation, p. 13141324.
Extended European Search Report for European Patent Application No. 22212413.3, dated Jul. 11, 2023, 17 pages.
Park, Kiru, et al., "Neural Object Learning for 6D Pose Estimation Using a Few Cluttered Images", Arxiv.org, Cornell University Library, 201 Olin Library Cornell University, Ithaca, NY 14853, Aug. 21, 2020, XP081745232, 23 pages.
Y. Yajima, "Vision Systems for Mobility Applications", May 31, 2020, XP055952623, URL:https://www.researchgate.net/publication/353776125_VISION_SYSTEMS_FOR_MOBILITY_APPLICATIONS, 79 pages.
Gahlert, N. et al., "Single-Shot 3D Detection of Vehicles from Monocular RGB Images via Geometry Constrained Keypoints in Real-Time", 2020, IEEE Intelligent Vehicles Symposium (IV), IEEE, Oct. 19, 2020, pp. 437-444, XP033873099, DOI: 10.1109/IV47402.2020.9304847.

* cited by examiner

FIG. 2

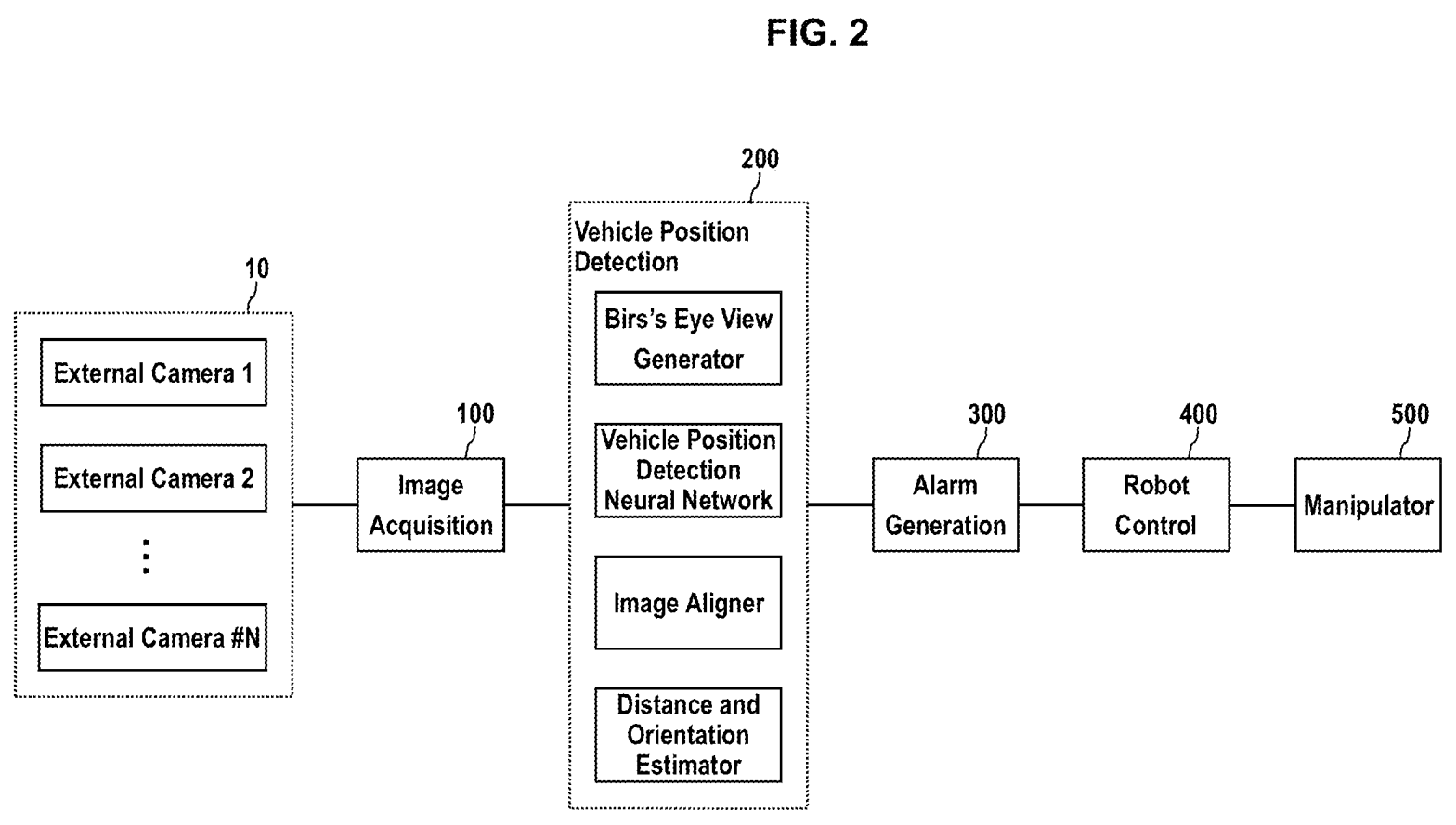

10
External Camera 1
External Camera 2
...
External Camera #N

100
Image Acquisition

200
Vehicle Position Detection
Birs's Eye View Generator
Vehicle Position Detection Neural Network
Image Aligner
Distance and Orientation Estimator 300
Alarm Generation 400
Robot Control 500
Manipulator

FIG. 4

$p_1^{world}$ $p_2^{world}$ $p_3^{world}$ $p_4^{world}$ $p_1^{bev}$ $p_2^{bev}$ $p_3^{bev}$ $p_4^{bev}$ <BEV Image>

METHOD AND DEVICE FOR DETECTING ELECTRIC VEHICLE USING EXTERNAL CAMERA AND ELECTRIC VEHICLE CHARGING ROBOT USING THE SAME

CROSS-REFERENCE TO RELATED APPLICATION

The present application claims a convention priority under 35 U.S.C. 119 based on Korean Patent Application No. 10-2021-0183360 filed on Dec. 21, 2021, with the Korean Intellectual Property Office (KIPO), the entire contents of which is incorporated herein by reference.

BACKGROUND

An electric vehicle (EV) is driven by an electric motor powered by a battery and has advantages over conventional vehicles of reducing pollutants such as exhaust gas and noise, less breakdown, longer life, and simpler driving operation. The EV may be charged by a conductive charging or a wireless power transfer at a charging station, for example. In the case of conductive charging, the EV charging may be performed by connecting the EV to the charging station by a conductor extending from the charging station to the EV. In the case of wireless power transfer, the EV charging may be performed by parking the EV on a charging spot of the charging station so that the power transfer may occur between coils of the EV and the charging spot.

When the EV may be to be charged at the charging station, it may be important to park the EV in a correct location for an efficient and safe charging regardless of a charging scheme, i.e., the conductive charging or the wireless power transfer. For example, in the case of the conductive charging, the EV must be parked so that a charging inlet of the EV may be reached by a plug of the charging conductor of the charging station. In the case of wireless power transfer, the power transfer may occur only when the EV may be accurately parked over the charging spot. Therefore, when the EV that requires the charging may be trying to park in the charging station, it may be necessary to detect the location of the EV. The detection of the EV position may be particularly required in the charging station employing an autonomous charging robot to drive a robot arm toward the charging inlet.

A process of checking a parking position of the electric vehicle may be very important to perform the charging of the electric vehicle. In case of the wireless charging, the charging may be performed only when the electric vehicle may be parked accurately over the charging spot. In case of the conductive charging, the electric vehicle should be parked in a position where the charging connector connected to an end of a charging cable may reach the charging inlet of the electric vehicle. In particular, when the conductive charging may be performed using an autonomous charging robot, it may be necessary to park the electric vehicle at a position where the autonomous charging robot may recognize the charging inlet of the electric vehicle and the charging connector provided at the end of the robot arm of the autonomous charging robot may be coupled to the charging socket of the electric vehicle.

Accordingly, there may be a need for a method and device capable of detecting a location and an orientation of the EV being parked for the charging in order to assist the EV to park at a predetermined charging position where the electric vehicle may be charged. Most EV charging robots may be equipped with vision sensors for recognizing the charging inlet of the EV, but the vision sensor becomes useless and the charging robot may not be able to respond if the EV may be out of a field of view of the vision sensor. In particular, the adequacy of the parking may be typically outside a detection range of the vision sensor of the charging robot.

SUMMARY

The present disclosure relates to a method and device for charging an electric vehicle and, more particularly, to a method and device for detecting an electric vehicle using an external camera to reliably guide the electric vehicle to a charging position. Additionally, the present disclosure relates to an electric vehicle charging robot employing the device for detecting the electric vehicle to control charging mechanism using position information detected by the device.

A method of detecting a position of an electric vehicle (EV) may use a camera external to the charging robot to determine whether the EV is parked or located in a proper position.

A device for detecting the EV may use the external camera to determine whether the EV is parked or located in a proper position.

A charging robot or a charging robot controller configured to determine a location of the EV based on an image acquired by an external camera to drive an actuator mechanism of the charging robot or to guide the EV to park in a proper position based on location information of the EV.

According to an exemplary embodiment, a vehicle position detection method, which may be performed by a device comprising a processor, may include: acquiring an original image of a vehicle from a camera; converting the original image into a bird's eye view image; detecting a bounding box associated with of the vehicle in the bird's eye view image by using the original image and the bird's eye view image; projecting the bird's-eye view image including the bounding box into a plane parallel with a ground to generate a projection image; and estimating a distance to the vehicle from a predetermined reference point or an orientation of the vehicle with respect to a predetermined reference line.

The operation of detecting the bounding box may be performed using an artificial neural network that may be trained. The artificial neural network may include a backbone network suitable for extracting features in the original image and the bird's eye view image and a detection head suitable for detecting the bounding box based on the features.

The operation of detecting the bounding box may include: detecting a plurality of bounding boxes; and excluding at least one unnecessary bounding box among the plurality of bounding boxes by using a non-maxima suppression (NMS).

The operation of projecting the bird's-eye view image including the bounding box into the plane parallel with the ground may include: mapping the bird's-eye view image to the projection image based on the vertices of parking lot dividing lines.

The operation of acquiring the original image of the vehicle from the camera may include: acquiring a plurality of original images from a plurality of cameras. In such a case, the operation of projecting the bird's-eye view image including the bounding box into the plane parallel with the ground may include: mapping a plurality of bird's-eye view images corresponding to the plurality of original images along with respective bounding boxes to the projection image; and calculating averages of the coordinates of a plurality of bounding boxes corresponding to respective bird's-eye view images to determine a final bounding box.

The operation of estimating the distance to the vehicle from the predetermined reference point or the orientation of the vehicle with respect to the predetermined reference line may include: determining an angle formed by a line segment of the final bounding box and a corresponding one of the parking lot dividing lines as the orientation of the vehicle.

The operation of estimating the distance to the vehicle from the predetermined reference point or the orientation of the vehicle with respect to the predetermined reference line may include: determining a distance between a line segment of the final bounding box and a predetermined reference object, i.e. a reference point or reference line, in the projection image.

According to an exemplary embodiment, a vehicle position detection device, may include: a memory having stored therein program instructions; and a processor coupled to the memory and executing the program instructions stored in the memory. The program instructions, when executed by the processor, may be configured to cause the processor to: acquire an original image of a vehicle from a camera; convert the original image into a bird's eye view image; detect a bounding box associated with of the vehicle in the bird's eye view image by using the original image and the bird's eye view image; project the bird's-eye view image including the bounding box into a plane parallel with ground to generate a projection image; and estimate a distance to the vehicle from a predetermined reference point or an orientation of the vehicle with respect to a predetermined reference line.

The program instructions causing the processor to detect the bounding box may include program instructions for implementing an artificial neural network configured to detect the bounding box. The artificial neural network may include a backbone network suitable for extracting features in the original image and the bird's eye view image and a detection head suitable for detecting the bounding box based on the features.

The program instructions causing the processor to detect the bounding box may include program instructions causing the processor to: detect a plurality of bounding boxes; and exclude at least one unnecessary bounding box among the plurality of bounding boxes by using a non-maxima suppression (NMS).

The program instructions causing the processor to project the bird's-eye view image including the bounding box into the plane parallel with ground may include program instructions causing the processor to: map the bird's-eye view image to the projection image based on the vertices of parking lot dividing lines.

The program instructions configured to cause the processor to acquire the original image of the vehicle from the camera may include program instructions configured to cause the processor to acquire a plurality of original images from a plurality of cameras. In such a case, the program instructions causing the processor to project the bird's-eye view image including the bounding box into the plane parallel with the ground may include program instructions causing the processor to: map a plurality of bird's-eye view images corresponding to the plurality of original images along with respective bounding boxes to the projection image; and calculate averages of the coordinates of a plurality of bounding boxes corresponding to respective bird's-eye view images to determine a final bounding box.

The program instructions configured to cause the processor to estimate the distance to the vehicle from the predetermined reference point or the orientation of the vehicle with respect to the predetermined reference line may include program instructions configured to cause the processor to determine an angle formed by a line segment of the final bounding box and a corresponding one of the parking lot dividing lines as the orientation of the vehicle.

The program instructions configured to cause the processor to estimate the distance to the vehicle from the predetermined reference point or the orientation of the vehicle with respect to the predetermined reference line may include program instructions configured to cause the processor to determine a distance between a line segment of the final bounding box and a predetermined reference object in the projection image.

According to an exemplary embodiment, an electric vehicle charging robot may include: a memory having stored therein program instructions; a processor coupled to the memory and executing the program instructions stored in the memory; a robot arm having a charging plug connected to a power source and installed at a distal end and configured to implement translational movement, rotational movement, or a combination thereof; and a manipulator configured to drive the robot arm. The program instructions, when executed by the processor, may be configured to cause the processor to: acquire an original image of a vehicle from a camera; convert the original image into a bird's eye view image; detect a bounding box associated with of the vehicle in the bird's eye view image by using the original image and the bird's eye view image; project the bird's-eye view image including the bounding box into a plane parallel with a ground to generate a projection image; estimate a distance to the vehicle from a predetermined reference point or an orientation of the vehicle with respect to a predetermined reference line; and control the manipulator to drive the robot arm when the orientation of the vehicle or the distance to the vehicle may be within a predetermined range.

The camera may be provided outside the electric vehicle charging robot.

The program instructions may be configured to cause the processor to estimate the distance to the vehicle from the predetermined reference point or the orientation of the vehicle with respect to the predetermined reference line may include program instructions causing the processor to: determine the orientation of the vehicle; and when the orientation of the vehicle may be out of a predetermined range, generate an alarm for a misalignment.

The program instructions may be configured to cause the processor to estimate the distance to the vehicle from the predetermined reference point or the direction of the vehicle with respect to the predetermined reference line may include program instructions configured to cause the processor to: determine the distance to the vehicle; and when the distance to the vehicle is out of a predetermined range, generate an alarm for a displacement.

Exemplary embodiments may be enabled to detect the position of the EV by use of the external camera and determine whether the EV may be parked or located in a proper position. Since the location information of the EV may be obtained using at least one external camera rather than any additional sensor or other arrangements in the charging robot itself, little costs may be incurred in the implementation of the exemplary embodiments.

According to the exemplary embodiments, since it may be possible to inform the driver whether the parking is being performed properly or not and to guide the driver or the EV to park in a proper manner, and induce correct parking, the driver's convenience may be improved and possible accidents that may occur during the parking may be prevented in advance.

BRIEF DESCRIPTION OF THE DRAWINGS

In order that the disclosure may be well understood, there will now be described various forms thereof, given by way of example, reference being made to the accompanying drawings, in which:

FIG. 2 is a functional block diagram of an autonomous charging robot according to an exemplary embodiment of the present disclosure;

FIG. 4 illustrates a process of acquiring the bird's-eye view image according to an exemplary embodiment of the present disclosure;

Figure 1:
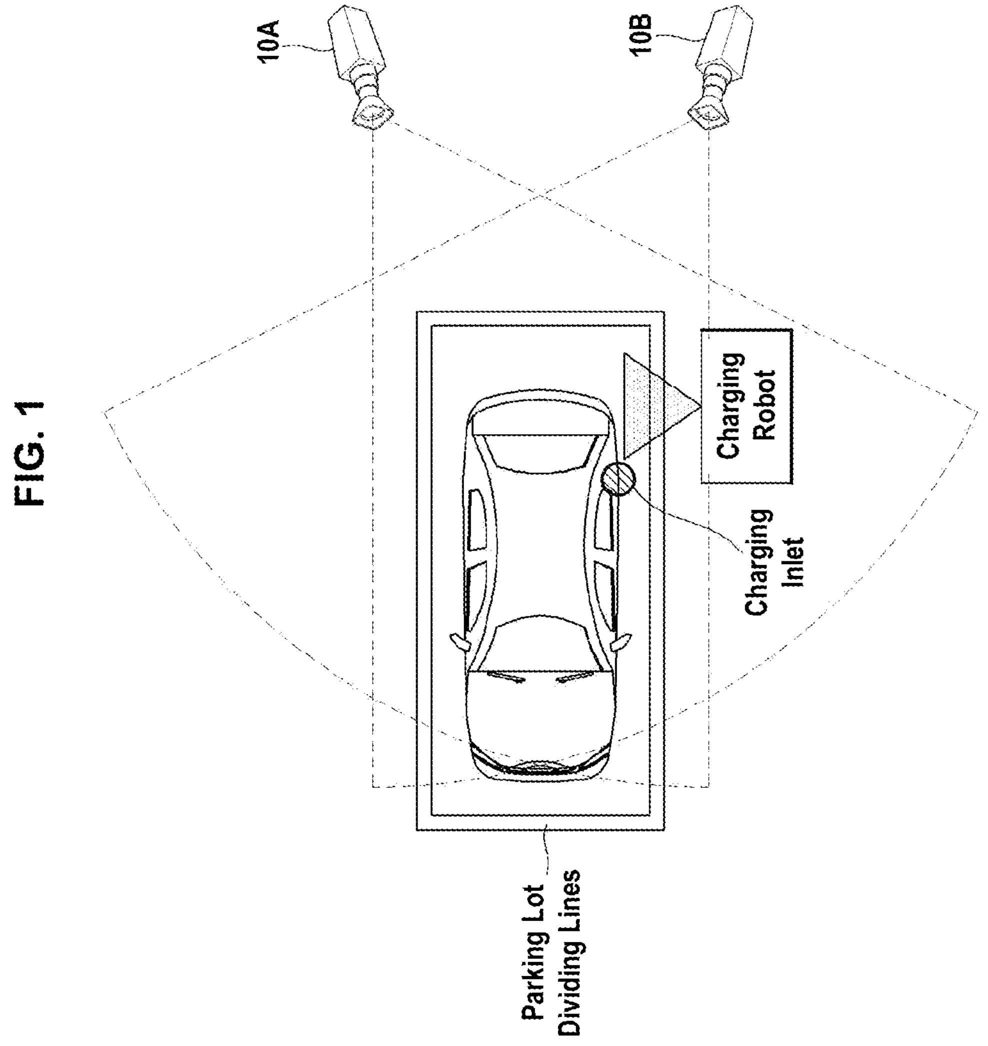
FIG. 1 is a schematic diagram illustrating a positional arrangement of a charging robot and an electric vehicle in a charging station.

The drawings described herein may be for illustration purposes only and may not be intended to limit the scope of the present disclosure in any way.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

For a clearer understanding of the features and advantages of the present disclosure, exemplary embodiments of the present disclosure will be described in detail with reference to the accompanied drawings. However, it should be understood that the present disclosure may not be limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification may be used to discriminate a component from the other ones but may not be intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the present disclosure, expressions "at least one of A and B" and "at least one of A or B" may mean a group comprising: "A", "B", or "both A and B", with or without additional elements of A and/or B. Also, expressions "one or more of A and B" and "one or more of A or B" may mean a group comprising: "A", "B", or "both A and B", with or without additional elements of A and/or B.

When a component may be referred to as being "connected" or "coupled" to another component, the component may be directly connected or coupled logically or physically to the other component or indirectly through an object therebetween. Contrarily, when a component may be referred to as being "directly connected" or "directly coupled" to another component, it may be to be understood that there may be no intervening object between the components. Other words used to describe the relationship between elements should be interpreted in a similar fashion.

The terminologies may be used herein for the purpose of describing particular exemplary embodiments only and may not be intended to limit the present disclosure. The singular forms include plural referents as well unless the context clearly dictates otherwise. Also, the expressions "comprises," "includes," "constructed," "configured" may be used to refer a presence of a combination of stated features, numbers, processing steps, operations, elements, or components, but may not be intended to preclude a presence or addition of another feature, number, processing step, operation, element, or component.

Spatially relative terms such as "below", "beneath", "lower", "above", "upper", and so on may be used to easily describe a relative position or direction with respect to a component. The terms, however, should not be regarded to designate an absolute position or direction of related objects. For example, when a component shown in the drawing may be turned over, a component described to be placed "below" or "beneath" another component may be placed "above" or "on" the other component. Accordingly, the preposition "below", for example, may include both directions of "below" and "above". Thus, the prepositions of places and direction usage may also be constructed to indicate another positions or directions, and the components in the descriptions of positions and directions may be constructed to be in the other positions and directions or orientations.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In the following description and the accompanied drawings, detailed descriptions of well-known functions or configuration that may obscure the subject matter of the present disclosure will be omitted for simplicity. Also, it may be to be noted that the same components may be designated by the same reference numerals throughout the drawings.

FIG. 1 is a schematic diagram illustrating a positional arrangement of a charging robot and an electric vehicle in a charging station.

In a charging station equipped with a charging robot, an electric vehicle (EV) to be charged by the charging robot may be required to be parked precisely in a designated parking spot because a charging arm of the charging robot has a limited length. A precise parking may be required also in the charging station in which a charging connector may be connected to an electric vehicle supply equipment (EVSE) through a cable instead of the autonomous charging robot. Further, in case of a wireless charging spot, the EV needs be positioned precisely over a ground assembly coil to facilitate an effective wireless power transfer to the electric vehicle.

A vehicle position detection device and method according to the present disclosure detects a position of the EV in a charging station by using images captured by at least one camera 10A and 10B to guide the EV to accurately park in a parking spot in the charging station. The cameras 10A and 10B may be separate devices not belonging to the vehicle position detection device. However, the present disclosure is not limited thereto, and at least one of cameras 10A and 10B may be a part of the vehicle position detection device. Meanwhile, the vehicle position detection device may be a separate device independent from the EV charging robot. Alternatively, however, the vehicle position detection may be included in the EV charging robot. In case that the position of the EV is incorrect for charging, the vehicle position detection device may generate an alarm for guiding the EV to accurately park in the parking spot in the charging station. In case that the EV is positioned properly for the charging, the EV charging robot may drive its mechanism based on EV position information detected by the vehicle position detection device to provide the EV with a charging service.

FIG. 2 is a functional block diagram of the EV charging robot according to an exemplary embodiment of the present disclosure. The EV charging robot according to the present embodiment may be interfaced to at least one external camera 10 to receive the camera image from the external camera 10 and operate based on the camera image. The EV charging robot may include an image acquisition module 100, a vehicle position detection module 200, an alarm generation module 300, a robot control module 400, and a manipulator 500. The vehicle position detection module 200 may include a bird's eye view generator 220, a vehicle position detection neural network 240, an image aligner 260, and a distance and orientation estimator 280. In an exemplary embodiment, the image acquisition module 100, the vehicle position detection module 100, and the robot control module 400 may be implemented by program instructions executable by a processor.

The external camera 10 may be installed such that view angle of the external camera 10 covers parking lot dividing lines of a parking spot of a charging point associated with the EV charging robot at least partially and the EV over the parking spot. Since the vehicle position detection module 200 of the EV charging robot determines whether the EV may be positioned suitably for the charging or not based on the parking lot dividing lines, it may be desirable that the external camera 10 may be installed to acquire the camera image including the parking lot dividing lines around the parking spot as much as possible along with the EV. A general-purpose closed circuit television (CCTV) camera installed fixedly to a structure of the charging station may be used for the external camera 10.

The image acquisition module 100 may receive the camera image captured by the at least one external camera 10. The image acquisition module 100 may provide the camera image to the vehicle position detection module 200. In case the image acquisition module 100 receives the camera images from a plurality of external cameras 100, the image acquisition module 100 may be configured to form a data set for the camera images from each of the plurality of external cameras 100 to provide the data set to the vehicle position detection module 200.

In the vehicle position detection module 200, the bird's eye view image generator 220 may be configured to perform a Bird's eye view (BEV) conversion on an original camera image from the image acquisition module 200 to convert the original camera image into a bird's eye view image. The vehicle position detection neural network 240 may be configured to receive the original image and the bird's eye view image associated with the original image to detect a bounding box enclosing the EV in the bird's eye view image.

The image aligner 260 may be configured to project the bird's eye view image onto a reference plane, which may be the ground or a plane parallel to the ground, by mapping vertices of the parking lot dividing lines into corresponding points on the reference plane. The image aligner 260 may be configured to project only the parking lot dividing lines, rather than the whole bird's eye view image, onto the reference plane. In addition, the image aligner 260 may be configured to project the bounding box onto the reference plane by mapping the vertices of the bounding box into corresponding points on the reference plane. If there are a plurality of bounding boxes detected from the plurality of original images, an average coordinate may be used for each of the vertices. Accordingly, a projected bird's eye view image and a two-dimensional (2D) bounding box may be aligned on a same plane by the image aligner 260.

The distance and orientation estimator 280 may be configured to estimate a distance between the EV and the EV charging robot. In an exemplary embodiment, the distance and orientation estimator 280 may be configured to calculate the distance between the EV and the EV charging robot by using coordinates of a center of the 2D bounding box and coordinates of the EV charging robot which may be registered in advance. Alternatively, the distance and orientation estimator 280 may be configured to calculate the distance between the EV and the EV charging robot by using coordinates of a center of the 2D bounding box and coordinates of the EV charging robot with reference to coordinates of a center of the projected parking spot, which may be calculated from coordinates of vertices of the projected parking spot. In addition, the distance and orientation estimator 280 may be configured to estimate an orientation of the EV by calculating an angle between a side of the 2D bounding box and a corresponding one of the parking lot dividing lines.

The robot control module 400 may be configured to calculate a target position and orientation of a charging connector installed at a distal end of a robot arm in the manipulator 500 based on the distance between the EV and the EV charging robot and the orientation of the EV. In addition, the robot control module 400 may be configured to calculate an actuation angle of each link of the robot arm to translate or rotate the links until the charging connector may reach the target position and orientation. First, the robot control module 400 may be configured to control the manipulator 500 such that the charging connector at the distal end of the manipulator 500 may be aligned with a charging inlet of the EV. Then, the robot control module 400 may be configured to control the manipulator 500 such that the charging connector may be inserted into the charging inlet of the EV.

The manipulator 500 may be an articulated robot arm including a plurality of links each having six degrees of freedom. The manipulator 500 may be provided with the charging connector at its distal end. The manipulator 500 may further include an image sensor installed near the charging connector to monitor a coupling state of the charging connector and the charging inlet of the EV. The image sensor may also be configured to acquire the original image instead of the external camera. The manipulator 500 may be driven, under a control of the robot control module 400, such that the charging connector may be aligned with the charging inlet of the EV and may be driven further such that the charging connector may be inserted into the charging inlet of the EV.

Figure 3:
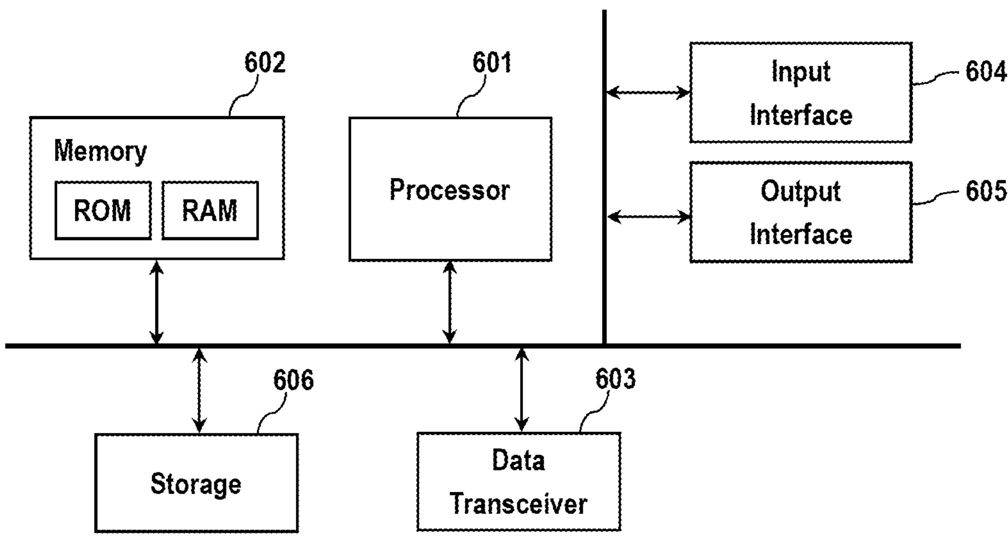
FIG. 3 is a block diagram illustrating a physical configuration of the vehicle position detection device according to an exemplary embodiment of the present disclosure.

FIG. 3 is a block diagram illustrating a physical configuration of the vehicle position detection device according to an exemplary embodiment of the present disclosure.

The vehicle position detection device 30, which may correspond to the vehicle position detection module 200 in FIG. 2, may include at least one processor 601 and a memory 602 suitable for storing program instructions to be executed by the processor 601. The vehicle position detection device may further include the at least one camera and a data transceiver 603 configured to perform communications with external devices including the external camera 10, the robot control module 400, and the manipulator 500. Further, the vehicle position detection device may further include an input interface 604, an output interface 605, and a storage 606. The components of the vehicle position detection device may be connected to each other through an internal bus 607 to communicate with each other.

The processor 601 may execute the program instructions stored in the memory 602 and/or the storage 606. The processor 601 may include a central processing unit (CPU) or a graphics processing unit (GPU), or may be implemented by another kind of dedicated processor suitable for performing the methods of the present disclosure.

The memory 602 may load the program instructions stored in the storage 606 to provide to the processor 601, so that the processor 601 may execute the program instructions. The memory 602 may include, for example, a volatile memory such as a read only memory (ROM) and a nonvolatile memory such as a random access memory (RAM).

The storage 606 may store the program instructions that may be loaded to the memory 602 and executed by the processor 601. The storage 606 may include an intangible recording medium suitable for storing the program instructions, data files, data structures, and a combination thereof.

Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD). The program instructions stored in the storage 606 may implement the operations of the bird's eye view generator 220, the vehicle position detection neural network 240, the image aligner 260, and the distance and orientation estimator 280 to perform the vehicle position detection method according to an exemplary embodiment of the present disclosure.

Figure 4:
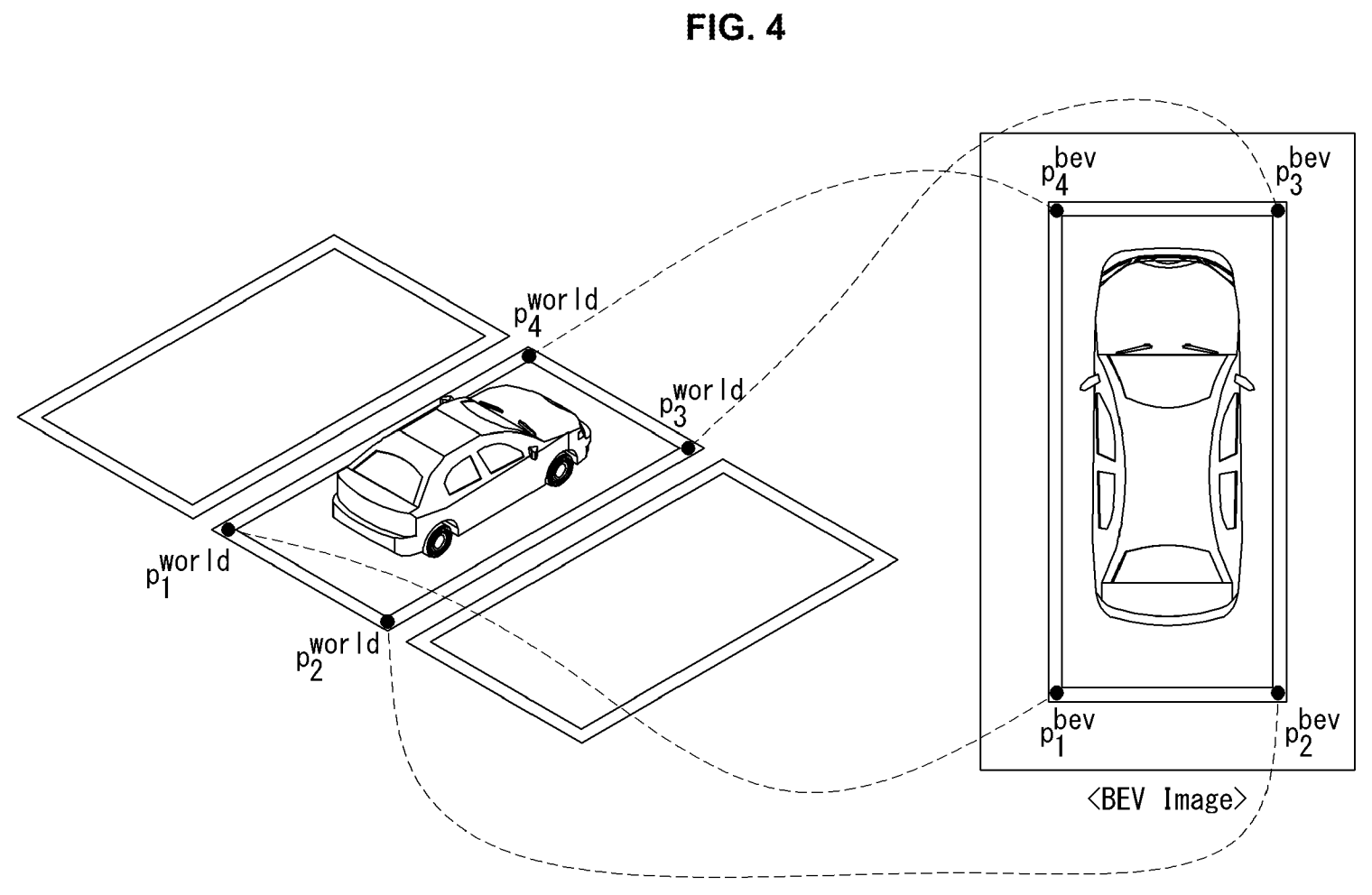

FIG. 4 illustrates a process of acquiring the bird's-eye view image according to an exemplary embodiment of the present disclosure.

The original image acquired by the external camera 10 may be converted into the bird's-eye view (BEV) image through a homography using predefined parameters. Here, the homography refers to a projective transform between two planes and may be represented by a matrix expressing the relationship between the two different planes, e.g., two images. The conversion of the original image from the external camera 10 into the bird's-eye view image may be expressed by Equation 1.

$$H_{orig}^{bev} = H_{world}^{bev} H_{orig}^{world} \quad \text{Equation 1}$$

In the Equation 1, $$H_a^b$$

may denote a homography that maps a coordinate system 'a' into a coordinate system 'b'. For example, $$H_{ori}^{bev}$$

may denote a homography that maps an original image to a bird's-eye view image. The acronym 'bev' denotes the bird's-eye view, 'orig' denotes the original image, and 'world' denotes a global coordinate system for representing the real world.

The homography $$H_{ori}^{world}$$

mapping the original image into the global coordinate system may be changed into a form of Equation 2.

$$H_{orig}^{world} = sK[r_1 r_2 t] \quad \text{Equation 2}$$

In the equation, 'K' may be an intrinsic parameter, [$r_1$ $r_2$ t] may be a matrix of extrinsic parameters excluding z-axis components, and 's' denotes a scaling factor.

The homography $$H_{world}^{bev}$$

mapping the global coordinate system into the bird's-eye view image in the Equation 1 may be calculated through a direct linear transformation (DLT) between coordinates of four points in the global coordinate system and coordinates of points in the bird's view image corresponding to the four points in the global coordinate system.

Figure 5:
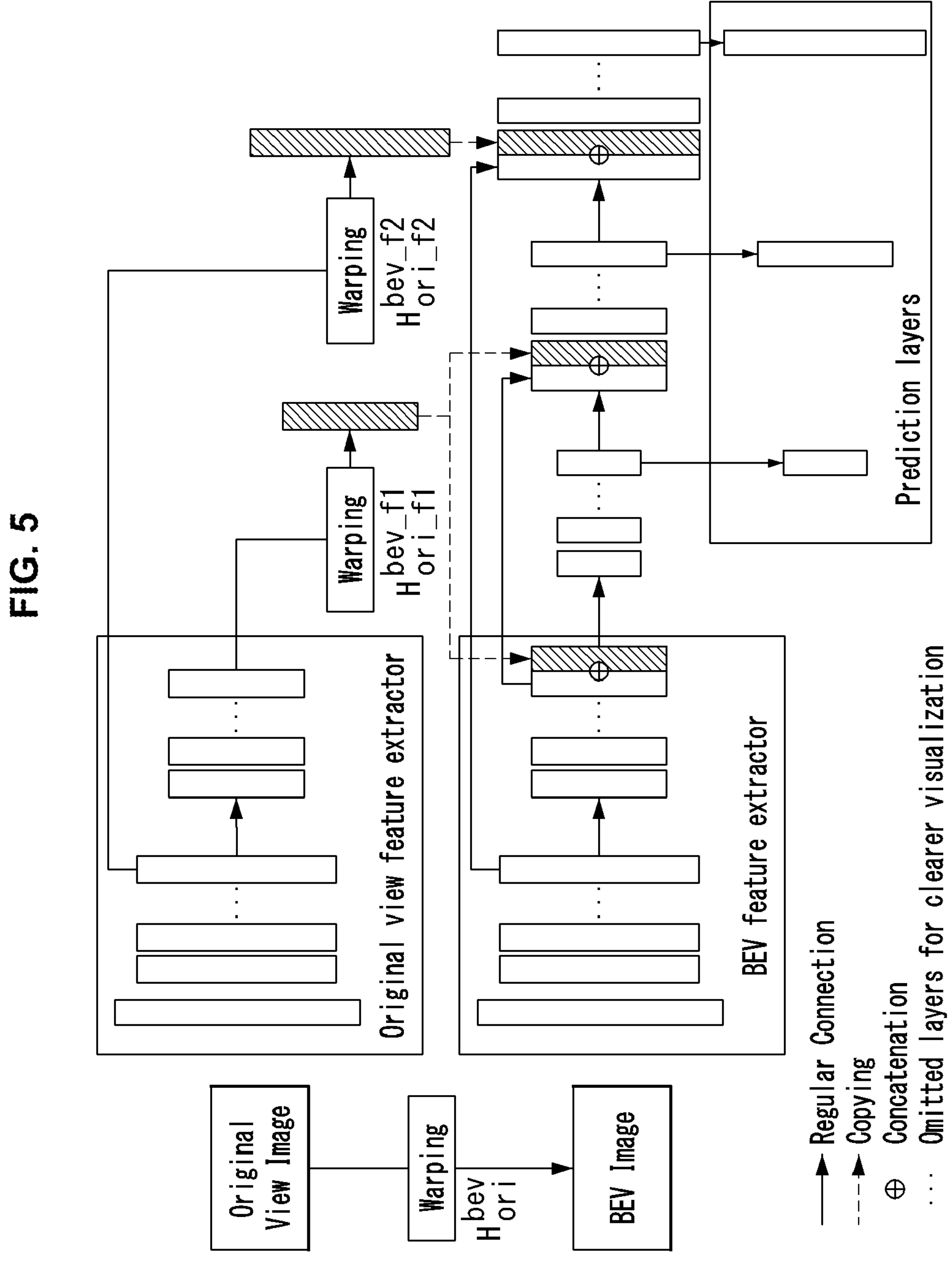
FIG. 5 is a block diagram of the vehicle position detection model operated by the vehicle position detection neural network according to an exemplary embodiment of the present disclosure.
Figure 6:
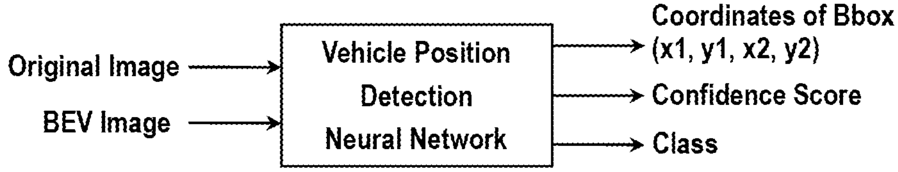
FIG. 6 illustrates inputs and outputs of the vehicle position detection model.

FIG. 5 is a block diagram of the vehicle position detection model operated by the vehicle position detection neural network 240 according to an exemplary embodiment of the present disclosure, and FIG. 6 illustrates inputs and outputs of the vehicle position detection model.

The vehicle position detection neural network 240 may be trained to generate and operate the vehicle position detection model. The vehicle position detection neural network 240 may include a MobileNet V3 network as a backbone network and a MnasFPN as a detection head. The vehicle position detection neural network may warp features of the original image and combine the features of the original image with features of the bird's-eye view image. The vehicle position detection neural network may have a robust feature learning capability by utilizing information of the original image together with the bird's-eye view image.

The vehicle position detection neural network 240 may be trained by operations of: augmenting training data of RGB images, processing augmented data by the neural network to set the bounding box, calculate a confidence score and a class, and optimize an objective function.

A data augmentation may be a technique to increase an amount of training data by adding slightly modified copies of already existing data by applying certain transformation operations to the already existing data and may enhance the performance of the neural network model.

The objective function of the vehicle position detection neural network that needs to be optimized may be expressed by Equation 3.

$$L(x, c, l, g) = \frac{1}{N}(L_{conf}(x, c) + \alpha L_{loc}(x, l, g) + \beta L_{rot}(x)) \quad \text{Equation 3}$$

Here, $L_{conf}(x, c)$ denotes a classification loss arising from the estimation of the class and may be referred to as a first loss function. The first loss function may be expressed by Equation 4.

$$L_{conf}(x, c) = -\sum_{i \in Pos}^{N} x_{ij}^{P} \log(\hat{c}_i^P) - \sum_{i \in Pos} \log(\hat{c}_i^P) \quad \text{Equation 4}$$

$$\text{where } \hat{c}_i^P = \frac{\exp(c_i^P)}{\sum_p \exp(c_i^P)}.$$

In the Equation 3, $L_{loc}(x, l, g)$ denotes a regression loss for estimating the bounding box and may be referred to as a second loss function. The second loss function may be expressed by Equation 5.

$$L(x, l, g) = \sum_{i \in Pos}^{N} \sum_{m \in \{cs, cy, w, h\}} x_{ij}^{k} smooth_{L1}(l_i^m - g_j^m) \quad \text{Equation 5}$$

$$\text{where } smooth_{L1} = \begin{cases} 0.5x^2 & \text{if } |x| < 1 \\ |x| - 0.5 & \text{otherwise} \end{cases}.$$

In the Equation 3, $L_{rot}(x)$ denotes a rotation loss generated when an orientation of the bounding box may be taken into account while the bounding box may be estimated and may be referred to as a third loss function.

An anchor box may be used to detect the bounding box. An anchor may refer to preset initial values of a width and height of an object, i.e. the EV. The initial values of the anchor may be changed according to the operation of the vehicle position detection module 200 to resize the anchor box and define the bounding box. The anchor box may be defined to be dependent on not only the aspect ratio but also an angle r, where r∈[0, π]. From this point of view, the third loss function may be expressed by Equation 6.

$$L_{rot}(x) = \sin^2(r_{pred} - r_{gt}) \quad \text{Equation 6}$$

Here, a ground truth $r_{gt}$ may be an actual value that may be used for a verification of a value calculated by the neural network. A predicted value $r_{pred}$ may be defined by Equation 7 with a constraint that a positive sample satisfies Equation 8. Here, the 'positive sample' may refer to a sample of which an intersection over union (IoU) between the predicted value and the ground truth that may be greater than or equal to a threshold value.

$$r_{pred} = \frac{\pi}{2}(\sigma(x) - 0.5) + r_0 \quad \text{Equation 7}$$

$$|r_{pred} - r_0| < \frac{\pi}{4} \quad \text{Equation 8}$$

Here, σ(x) is a sigmoid function which is widely used as an activation function in machine learning. $r_0$ denotes a preset angle of the anchor.

The vehicle position detection neural network 240 may optimize the objective function of Equation 3 based on the Equations 4-8. The vehicle position detection model may derive candidate bounding boxes based on the input image through the above learning process and determine a final bounding box by removing overlapping ones from the candidate bounding boxes through a non-maximum suppression (NMS) algorithm.

Referring to FIG. 6, the vehicle position detection neural network 240 may receive the original image and the bird's eye view image as input data, and may output values of the bounding box coordinates, the confidence score, and a class. Here, the class may have a value of zero or one depending on whether a vehicle may be detected or not.

If the vehicle position detection model is generated using two or more cameras, the vehicle position detection model may generate a bounding box for each of the cameras. That is, the vehicle position detection model may generate the bounding boxes for the cameras by using respective original images and the bird's eye view images. Accordingly, the vehicle position detection model may output information on a plurality of bounding boxes of which number may be the same as the number of the cameras.

Figure 7:
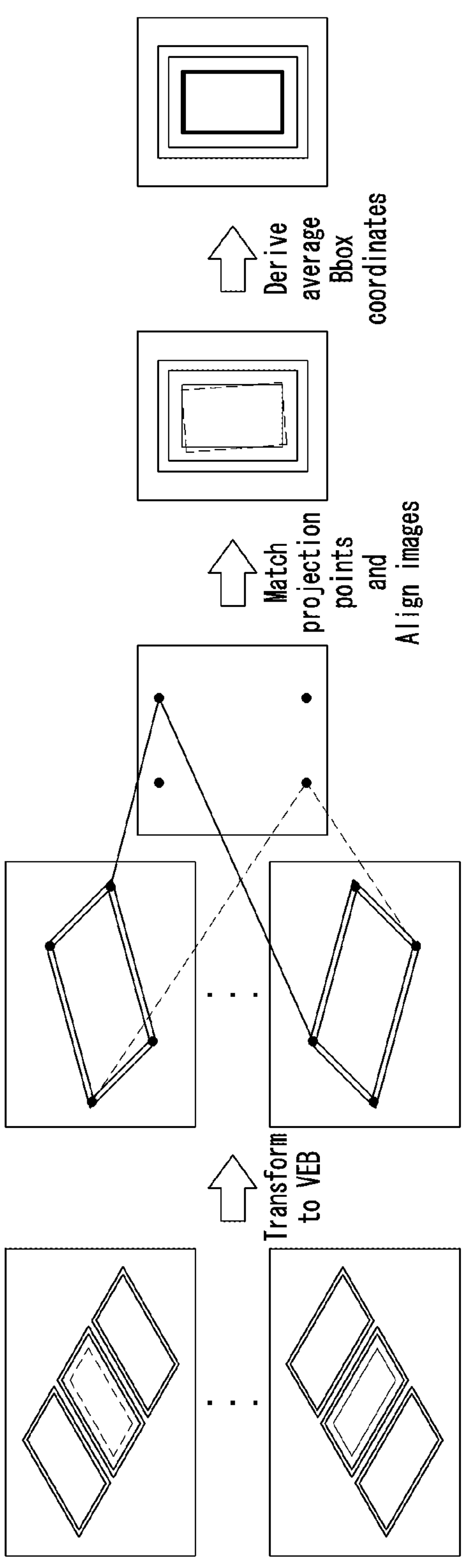
FIG. 7 illustrates a process of deriving the coordinates of the final bounding box according to an exemplary embodiment of the present disclosure.

FIG. 7 illustrates a process of deriving the coordinates of the final bounding box according to an exemplary embodiment of the present disclosure. The original images acquired from the external cameras 10 may be converted to respective bird's-eye view images through the BEV conversion. After the bounding boxes are detected in the original images and the bird's-eye view images, a single projection image may be generated by matching and aligning the images based on the vertices of the parking lot dividing lines. At this time, the bounding boxes detected from the images may also be mapped to the projection image. The final bounding box may be derived by calculating averages of the coordinates for each of the vertices of the bounding boxes in the projection image. The distance to the vehicle from the EV charging robot and the orientation of the vehicle may be estimated by using the final bounding box and the parking lot dividing lines of the parking spot.

Figure 8A:
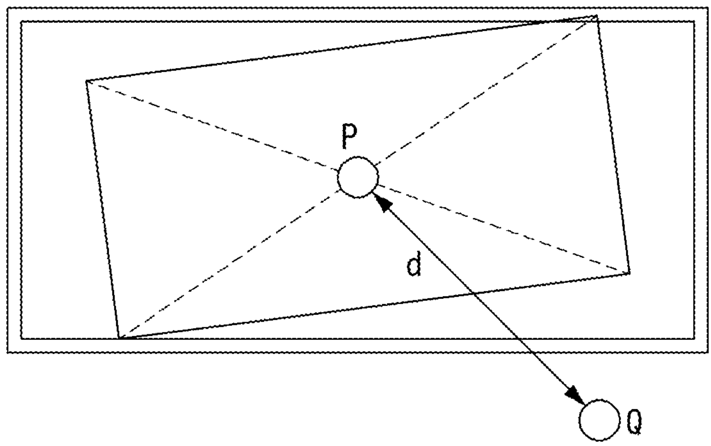
FIG. 8A illustrates an example of estimating the distance to the vehicle from the EV charging robot according to an exemplary embodiment of the present disclosure.
Figure 8B:
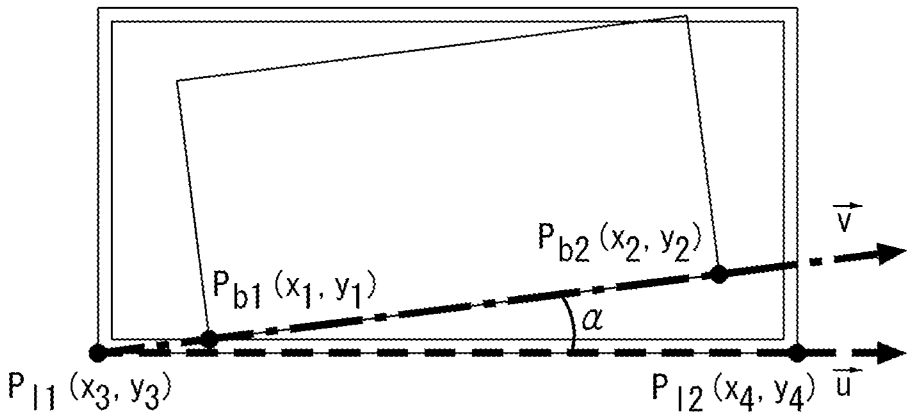
FIG. 8B illustrates an example of estimating the orientation of the vehicle according to an exemplary embodiment of the present disclosure.

FIG. 8A illustrates an example of estimating the distance to the vehicle from the EV charging robot according to an exemplary embodiment of the present disclosure, and FIG. 8B illustrates an example of estimating the orientation of the vehicle according to an exemplary embodiment of the present disclosure.

Referring to FIG. 8A, the distance between the EV charging robot and the vehicle may be determined by calculating the distance between the position of the charging robot and a central point of the final bounding box in the projection image. Assuming that the coordinates of the central point of the final bounding box are $P(x_5, y_5)$ and the coordinates of the EV charging robot is $Q(x_6, y_6)$, the distance between the EV charging robot and the vehicle may be calculated by Equation 9.

$$d=\sqrt{(x_6-x_5)^2+(y_6-y_5)^2} \quad \text{Equation 9}$$

Instead, however, the distance between the EV charging robot and the vehicle may be determined by calculating a distance between a line segment of the final bounding box and a certain reference object such as a point or line in the projection image.

Referring to FIG. 8B, the orientation of the vehicle may be obtained by calculating an angle between a straight line or line segment in the final bounding box and a corresponding line among the parking lot dividing lines. In the example of FIG. 8B, calculated is the angle between the line segment connecting two vertices $P_{b1}$ and $P_{b2}$ in the final bounding box and the straight line connecting two vertices $P_{l1}$ and $P_{l2}$ in the parking space partitions. The vertices $P_{l1}$ and $P_{l2}$ in the parking space partitions correspond to vertices $P_{b1}$ and $P_{b2}$ in the final bounding box, respectively. Assuming the coordinates of the vertices are expressed by Equation 10, a vector ($\vec{v}'$) formed by the points $P_{b1}$ and $P_{b2}$ in the final bounding box may be expressed by Equation 11 and a vector ($\vec{u}'$) formed by the points $P_{l1}$ and $P_{l2}$ in the parking lot dividing lines may be expressed by Equation 12.

$$P_{b1}=(x_1,y_1), P_{b2}=(x_2,y_2), P_{l1}=(x_3,y_3), P_{l2}=(x_4,y_4) \quad \text{Equation 10}$$

$$\vec{v'} = (v_1', v_2') = (x_2 - x_1, y_2 - y_1) \quad \text{Equation 11}$$

$$\vec{u'} = (u_1', u_2') = (x_4 - x_3, y_4 - y_3) \quad \text{Equation 12}$$

The orientation of the vehicle may be calculated by subtracting an angle representing a direction of the vector ($\vec{u}'$) from an angle representing a direction of the vector ($\vec{v}'$) as shown in Equation 13. The directions of the vectors ($\vec{u}'$ and $\vec{v}'$) may be represented by the directions of their unit vectors ($\vec{u}$ and $\vec{v}$). The unit vectors ($\vec{v}$ and $\vec{v}$) may be obtained by dividing the vectors ($\vec{u}'$ and $\vec{v}'$) by their norms as shown in Equations 14 and 15.

$$\alpha = \arctan\left(\frac{v_2'}{v_1'}\right) - \arctan\left(\frac{u_2'}{u_1'}\right) = \arctan\left(\frac{v_2}{v_1}\right) - \arctan\left(\frac{u_2}{u_1}\right) \quad \text{Equation 13}$$

$$\vec{v} = \frac{\vec{v'}}{\|\vec{v'}\|} = (v_1, v_2) \quad \text{Equation 14}$$

$$\vec{u} = \frac{\vec{u'}}{\|\vec{u'}\|} = (u_1, u_2) \quad \text{Equation 15}$$

Figure 9:
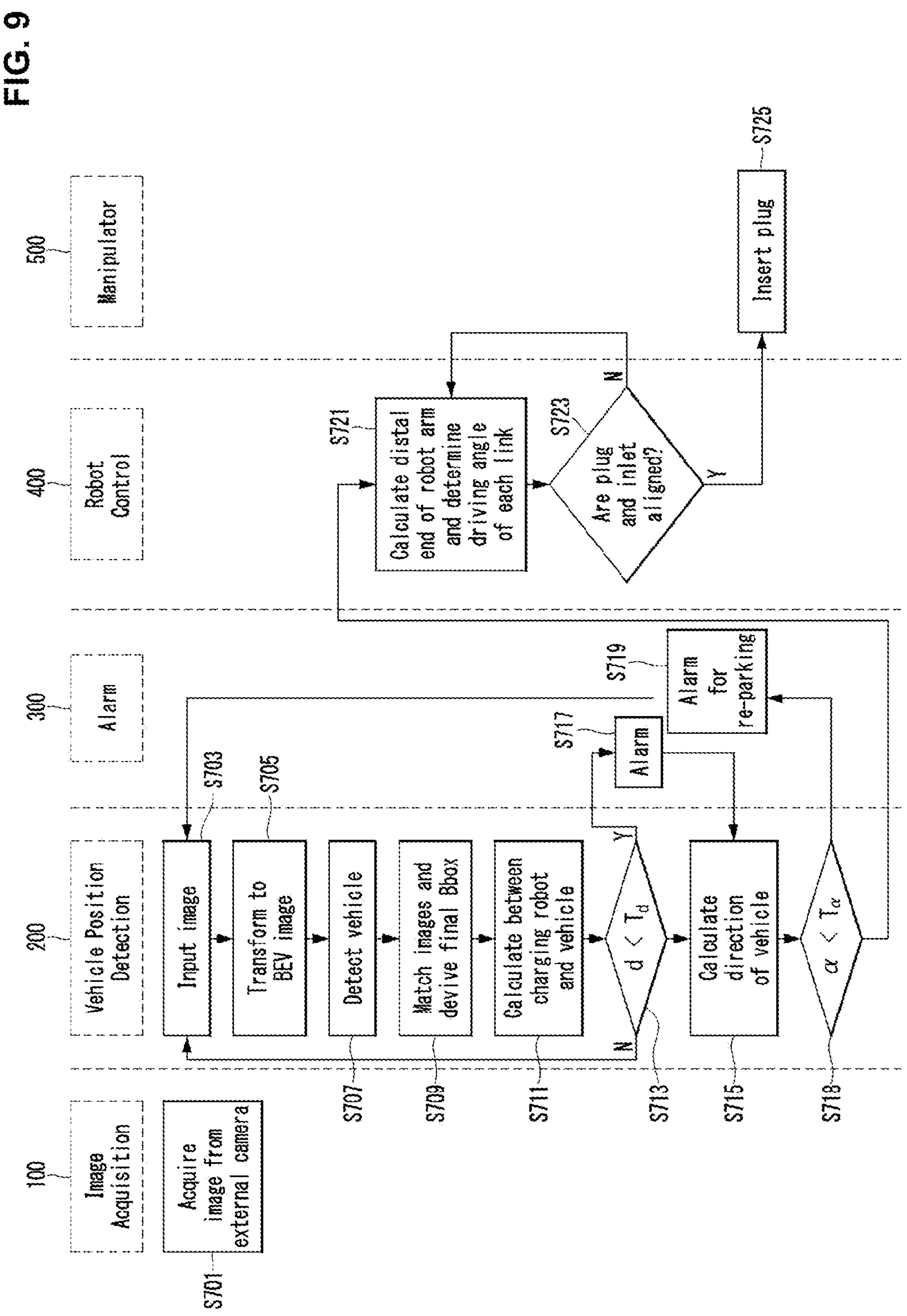
FIG. 9 is a flowchart showing an operation of the EV charging robot according to an exemplary embodiment of the present disclosure.

FIG. 9 is a flowchart showing an operation of the EV charging robot according to an exemplary embodiment of the present disclosure.

The image acquisition module 100 may acquire the camera image captured by the external camera 10 (S701). The image acquisition module 100 may provide the vehicle position detection module 200 with the original image which may be the camera image from the external camera 100 (S703). In the vehicle position detection module 200, the bird's eye view generator 220 may convert the original image into the bird's eye view image through the homography defined by the preset parameters (S705). The trainable vehicle position detection neural network 240, which may perform the vehicle position detection, may detect the bounding boxes surrounding the vehicle in the original image and the bird's eye view image.

In case of using a plurality of external cameras 10, the vehicle position detection neural network 240 may be trained by inputting the original image and the bird's eye view image, in batches, for each of the plurality of external cameras 10. In such a case, a single BEV projection image may be generated by aligning the images with respect to the vertices of the parking lot dividing lines, and the final bounding box may be determined by averaging the coordinates of the bounding boxes (S709). The distance between the EV charging robot and the vehicle may be determined by calculating the distance, for example, between the position of the charging robot and a central point of the final bounding box in the projection image (S711). That is, assuming that the coordinates of the central point of the final bounding box are $P(x_5, y_5)$ and the coordinates of the EV charging robot are $Q(x_6, y_6)$, the distance between the EV charging robot and the vehicle may be calculated by Equation 9.

The calculated distance (d) may be compared with a certain threshold ($T_d$) (S713). If the distance (d) is greater than or equal to the threshold ($T_d$) in the operation S713, a new image may be input from the image acquisition module 100 and the distance (d) may be calculated again. The operations S701-S713 may be carried out repeatedly until the calculated distance (d) is smaller than the threshold ($T_d$).

In the case that the calculated distance (d) is smaller than the threshold ($T_d$), an alarm may be generated by the alarm generation module 300 because there may be a risk that the vehicle may collide with the EV charging robot (S717). The alarm generation module 300 may provide a visual alarm such as a warning light, an audible alarm such as a beep sound, or a combination of such the visual alarm and the audible alarm. In particular, when the vehicle may be an autonomous vehicle, the alarm generation module 300 may transmit a caution signal or a stop request signal to the vehicle.

In addition, the orientation or a heading angle ($\alpha$) of the vehicle may be calculated according to the Equation 13 by using the final bounding box (S715). The calculated heading angle ($\alpha$) of the vehicle may be compared with a certain threshold ($T_\alpha$) (S718). Here, the threshold angle ($T_\alpha$) may mean a limit of the heading angle which enable the charging connector of the EV charging robot having a plurality of links to be connected to the charging inlet of the vehicle.

If the heading angle ($\alpha$) is greater than or equal to the threshold ($T_\alpha$) in the operation S718, the charging connector of the EV charging robot cannot be connected to the charging inlet of the vehicle and the charging for the vehicle cannot be performed. Thus, the alarm generation module 300 may generate an alarm to request the vehicle driver to park the vehicle again (S719). In such a case, a new image may be input from the image acquisition module 100 and the heading angle ($\alpha$) may be calculated again. The operations S701-S718 may be carried out repeatedly until the heading angle ($\alpha$) is smaller than the threshold ($T_\alpha$).

When the heading angle ($\alpha$) is smaller than the threshold ($T_\alpha$), the robot control module 400 may calculate the target position and orientation of a charging connector based on the distance between the EV and the EV charging robot and the heading angle of the EV. Further, the robot control module 400 may calculate the actuation angles of the links of the robot arm in the manipulator 500 to translate or rotate the links (S721). The robot control module 400 may determine whether the charging connector at the distal end of the manipulator 500 may be aligned with the charging inlet of the EV (S723). The links of the manipulator 500 may be driven until the charging connector at the distal end of the manipulator 500 may be aligned with the charging inlet of the EV. After the charging connector may be aligned with the charging inlet of the EV, the robot control module 400 may control the manipulator 500 such that the charging connector may be inserted into the charging inlet of the EV (S725).

As mentioned above, the apparatus and method according to exemplary embodiments of the present disclosure may be implemented by computer-readable program codes or instructions stored on a non-transitory computer-readable recording medium. The non-transitory computer-readable recording medium includes all types of recording media storing data readable by a non-transitory computer system. The computer-readable recording medium may be distributed over computer systems connected through a network so that a computer-readable program or code may be stored and executed in a distributed manner.

The non-transitory computer-readable recording medium may include a hardware device specially configured to store and execute program commands, such as ROM, RAM, and flash memory. The program commands may include not only machine language codes such as those produced by a compiler, but also high-level language codes executable by a computer using an interpreter or the like.

Some embodiments of the present disclosure have been described above in the context of a device but may be described using a method corresponding thereto. In particular, blocks or the device corresponds to operations of the method or characteristics of the operations of the method. Similarly, embodiments of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some exemplary embodiments, at least one of most important operations of the method may be performed by such a device.

The description of the disclosure may be merely exemplary in nature and, thus, variations that do not depart from the substance of the disclosure may be intended to be within the scope of the disclosure. Such variations may not be to be regarded as a departure from the spirit and scope of the disclosure. Thus, it will be understood by those of ordinary skill in the art that various changes in form and details may be made without departing from the spirit and scope as defined by the following claims.

What is claimed is:

1. A vehicle position detection method performed by a device comprising a processor, the method comprising:

acquiring a plurality of original images of a vehicle from a plurality of cameras;

converting each of the plurality of original images into a bird's eye view image;

detecting a bounding box associated with the vehicle in each of the bird's eye view images by using the original image and the bird's eye view image that correspond to each other;

projecting the bird's-eye view images including the bounding box into a plane parallel with a ground to generate a projection image; and estimating a distance to the vehicle from a predetermined reference point or an orientation of the vehicle with respect to a predetermined reference line; and controlling a manipulator to drive a robot arm when the orientation of the vehicle or the distance to the vehicle is within a predetermined range, wherein projecting the bird's-eye view images including the bounding box into the plane parallel with the ground comprises:

mapping the bird's-eye view images corresponding to the plurality of original images along with respective bounding boxes to the projection image; and calculating averages of the coordinates of a plurality of bounding boxes corresponding to respective bird's-eye view images to determine a final bounding box.

2. The vehicle position detection method of claim 1, wherein detecting the bounding box is performed by using an artificial neural network.

3. The vehicle position detection method of claim 2, wherein the artificial neural network comprises a backbone network configured to extract features in the plurality of original images and the bird's eye view images and a detection head configured to detect the bounding box based on the features.

4. The vehicle position detection method of claim 2, wherein detecting the bounding box comprises:

detecting the plurality of bounding boxes; and excluding at least one bounding box among the plurality of bounding boxes by using a non-maxima suppression (NMS).

5. The vehicle position detection method of claim 1, wherein projecting the bird's-eye view images including the bounding box into the plane parallel with the ground comprises:

mapping the bird's-eye view images to the projection image based on the vertices of parking lot dividing lines.

6. The vehicle position detection method of claim 5, wherein estimating the distance to the vehicle from the predetermined reference point or the orientation of the vehicle with respect to the predetermined reference line comprises:

determining an angle formed by a line segment of the final bounding box and a corresponding one of the parking lot dividing lines as the orientation of the vehicle.

7. The vehicle position detection method of claim 1, wherein estimating the distance to the vehicle from the predetermined reference point or the orientation of the vehicle with respect to the predetermined reference line comprises:

determining a distance between a line segment of the final bounding box and the predetermined reference point in the projection image.

8. A vehicle position detection device, comprising:

a memory having stored therein program instructions; and a processor coupled to the memory and executing the program instructions stored in the memory, wherein the processor is configured to:

acquire a plurality of original images of a vehicle from a plurality of cameras;

convert each of the plurality of original images into a bird's eye view image;

detect a bounding box associated with the vehicle in each of the bird's eye view images by using the original image and the bird's eye view image that correspond to each other, project the bird's-eye view images including the bounding box into a plane parallel with a ground to generate a projection image, by:

mapping the bird's-eye view images corresponding to the plurality of original images along with respective bounding boxes to the projection image; and calculating averages of the coordinates of a plurality of bounding boxes corresponding to respective bird's-eye view images to determine a final bounding box; and estimate a distance to the vehicle from a predetermined reference point or an orientation of the vehicle with respect to a predetermined reference line; and control a manipulator to drive a robot arm when the orientation of the vehicle or the distance to the vehicle is within a predetermined range.

9. The vehicle position detection device of claim 8, wherein the processor is further configured to detect the bounding box by implementing an artificial neural network.

10. The vehicle position detection device of claim 9, wherein the artificial neural network comprises a backbone network configured to extract features in the plurality of original images and the bird's eye view images and a detection head suitable for detecting the bounding box based on the features.

11. The vehicle position detection device of claim 9, wherein the processor is further configured to:

detect the plurality of bounding boxes; and exclude at least one bounding box among the plurality of bounding boxes by using a non-maxima suppression (NMS).

12. The vehicle position detection device of claim 8, wherein the processor is further configured to:

map the bird's-eye view images to the projection image based on the vertices of parking lot dividing lines.

13. The vehicle position detection device of claim 12, wherein the processor is further configured to:

determine an angle formed by a line segment of the final bounding box and a corresponding one of the parking lot dividing lines as the orientation of the vehicle.

14. The vehicle position detection device of claim 8, wherein the processor is further configured to:

determine a distance between a line segment of the final bounding box and the predetermined reference point in the projection image.

15. An electric vehicle charging robot, comprising:

a memory having program instructions stored therein;

a processor coupled to the memory and executing the program instructions stored in the memory;

a robot arm having a charging plug connected to a power source and installed at a distal end and configured to implement translational movement, rotational movement, or a combination of translational movement and rotational movement; and a manipulator configured to drive the robot arm, wherein the processor is configured to:

acquire a plurality of original images of a vehicle from a plurality of cameras;

convert each of the plurality of original images into a bird's eye view image;

detect a bounding box associated with the vehicle in each of the bird's eye view images by using the original image and the bird's eye view image that correspond to each other;

project the bird's-eye view images including the bounding box into a plane parallel with a ground to generate a projection image, by:

mapping the bird's-eye view images corresponding to the plurality of original images along with respective bounding boxes to the projection image; and calculating averages of the coordinates of a plurality of bounding boxes corresponding to respective bird's-eye view images to determine a final bounding box;

estimate a distance to the vehicle from a predetermined reference point or an orientation of the vehicle with respect to a predetermined reference line; and control the manipulator to drive the robot arm when the orientation of the vehicle or the distance to the vehicle is within a predetermined range.

16. A system comprising the electric vehicle charging robot of claim 15, wherein one or more of the plurality of cameras are provided outside the electric vehicle charging robot.

17. The system of claim 16, wherein the processor is further configured to:

determine the orientation of the vehicle; and when the orientation of the vehicle is out of the predetermined range, generate an alarm for a misalignment.

18. The system of claim 16, wherein the processor is further configured to:

determine the distance to the vehicle; and when the distance to the vehicle is out of the predetermined range, generate an alarm for a displacement.

* * * * *